US012669265B2

(12) United States Patent
Ford

(10) Patent No.: US 12,669,265 B2
(45) Date of Patent: Jun. 30, 2026

(54) HEATER ASSEMBLY

(71) Applicant: Dyson Technology Limited, Wiltshire (GB)

(72) Inventor: Samuel Michael John Ford, Bristol (GB)

(73) Assignee: Dyson Technology Limited, Malmesbury (GB)

( * ) Notice: Subject to any disclaimer, the term of this patent is extended or adjusted under 35 U.S.C. 154(b) by 699 days.

(21) Appl. No.: 18/028,148

(22) PCT Filed: Sep. 9, 2021

(86) PCT No.: PCT/GB2021/052325
§ 371 (c)(1),
(2) Date: Mar. 23, 2023

(87) PCT Pub. No.: WO2022/069859
PCT Pub. Date: Apr. 7, 2022

(65) Prior Publication Data

US 2023/0375224 A1 Nov. 23, 2023

(30) Foreign Application Priority Data

Sep. 30, 2020 (GB) ..................................... 2015516

(51) Int. Cl.
*F24H 3/04* (2022.01)
*H05B 3/00* (2006.01)

(52) U.S. Cl.
CPC ......... *F24H 3/0405* (2013.01); *H05B 3/0014* (2013.01)

(58) Field of Classification Search
CPC ... F24H 3/0405; F24H 3/0423; H05B 3/0014; H05B 3/20; H05B 3/38; H05B 2203/005; A45D 20/08; A45D 20/10; A45D 20/12
See application file for complete search history.

(56) References Cited

U.S. PATENT DOCUMENTS 3,788,721 A 1/1974 Vause
3,798,417 A 3/1974 Bittner
(Continued)

FOREIGN PATENT DOCUMENTS

CN 103423178 A 12/2013
CN 105319922 A 2/2016
(Continued)

OTHER PUBLICATIONS

International Search Report and Written Opinion received for PCT Patent Application No. PCT/GB2021/052324, mailed on Dec. 23, 2021, 7 pages.

(Continued)

*Primary Examiner* — Elton K Wong
(74) *Attorney, Agent, or Firm* — Tucker Ellis LLP; Michael G. Craig

(57) ABSTRACT

A heater assembly for a haircare appliance includes an air duct defining an air flow path extending from an upstream end to a downstream end; a first heater element positioned in the flow path, the first heater element having a first electrical path defined between cut-outs in a first sheet, the air flow path extending through said cut-outs; and a second heater element positioned in the flow path downstream of the first heater element, the second heater element having a second electrical path defined between cut-outs in a second sheet, the air flow path extending through said cut-outs. The first electrical path has a first width and the second electrical path has a corresponding second width which is different to the first width.

15 Claims, 8 Drawing Sheets

(56) References Cited

U.S. PATENT DOCUMENTS

| | | | | |
|---|---|---|---|---|
| 4,516,108 | A | 5/1985 | Buguet et al. | |
| 4,767,914 | A * | 8/1988 | Glucksman | A45D 20/12 34/523 |
| 5,034,721 | A | 7/1991 | Benedictus | |
| 5,408,071 | A | 4/1995 | Ragland et al. | |
| 5,750,964 | A | 5/1998 | Counts et al. | |
| 10,660,369 | B2 | 5/2020 | Fursa | |
| 11,490,460 | B2 | 11/2022 | Tumpold et al. | |
| 2009/0139984 | A1 | 6/2009 | Sherrill et al. | |
| 2010/0072186 | A1 * | 3/2010 | Schehr | F24H 3/0429 219/217 |
| 2011/0209721 | A1 | 9/2011 | Yahnker et al. | |
| 2015/0037015 | A1 | 2/2015 | Lee | |
| 2017/0112256 | A1 | 4/2017 | Bobillier et al. | |
| 2017/0164709 | A1 * | 6/2017 | Laveni | A45D 20/10 |
| 2017/0268801 | A1 | 9/2017 | Ikesaki | |
| 2023/0363509 | A1 | 11/2023 | Ford | |
| 2024/0015856 | A1 | 1/2024 | Ford | |

FOREIGN PATENT DOCUMENTS

| | | | |
|---|---|---|---|
| CN | 107580460 | A | 1/2018 |
| CN | 108235466 | A | 6/2018 |
| CN | 110916327 | A | 3/2020 |
| CN | 111093421 | A | 5/2020 |
| DE | 19831417 | A1 | 1/2000 |
| EP | 0355210 | A1 | 2/1990 |
| EP | 3158890 | A1 | 4/2017 |
| ES | 2696900 | T3 | 1/2019 |
| GB | 2181311 | A | 4/1987 |
| JP | H04132508 | A | 5/1992 |
| JP | 10-022065 | A | 1/1998 |
| JP | 2002085143 | A | 3/2002 |
| JP | 2009207832 | A | 9/2009 |
| WO | 2013144573 | A1 | 10/2013 |
| WO | 2016/172441 | A1 | 10/2016 |

OTHER PUBLICATIONS

International Search Report and Written Opinion received for PCT Patent Application No. PCT/GB2021/052326, mailed on Jan. 12, 2022, 8 pages.

Outgoing—ISA/210—International Search Report Mailed on Dec. 23, 2021 for WO Application No. PCT/GB21/052325, 7 page(s).

Shao Shuxiao et al., "Development of Clothes Drying Device", Industrial Technology, Science and Technology Information, 2011, No. 13, 2 pages.

Search Report received for GB Application No. 2015517.2, mailed on Feb. 25, 2021, 1 page.

Search Report received for GB Application No. 2015516.4, mailed on Feb. 16, 2021, 1 page.

Search report received for Great Britain Patent Application No. 2015515.6 mailed on Feb. 16, 2021, 1 page.

* cited by examiner

HEATER ASSEMBLY

CROSS-REFERENCE TO RELATED APPLICATIONS

This application is the National Stage of International Application No. PCT/GB2021/052325 filed Sep. 9, 2021, and claims benefit of United Kingdom Application No. 2015516.4 filed Sep. 30, 2020, each of which are herein incorporated by refererence in their entirety.

BACKGROUND

Heater assemblies for haircare appliances such as hairdryers generally use heater elements made from one or more loops or helical coils of undulating wire. An electric current is passed through the wire, causing it to heat up and thus heat up air flowing over it. However, such heaters have numerous disadvantages. For example, the wire is generally supported in an air flow path by mica supports, but these can obstruct air flow, leading to uneven heating. Further, the wire is of fixed diameter, meaning that every part of the or each heater element made from the wire has the same cross sectional area in the direction of electrical flow. This means that each part of the heating element experiences electrical heating to the same extent. However, parts of heater elements which are positioned downstream of other parts of a heater element (be it the same heater element or a different one) experience less cooling from air passing over them due to that air having already been heated. Similarly, parts of heater elements in 'dead zones' in the air flow path (such as may be caused by support structures) can experience less cooling due to air flowing over them at lower velocities. Parts which receive less cooling from air can fail from overheating despite the conditions (e.g. electrical power delivered and overall air flow rate) being satisfactory for the heater element(s) as a whole. In many cases the only practical way of mitigating such failure is to reduce the electrical power delivered to the entire heater assembly, which reduces the ability of the heater assembly to perform its function.

SUMMARY

It is an object of the invention to mitigate or obviate at least one of the aforesaid disadvantages, or to provide an improved or alternative heater assembly.

According to a first aspect of the present invention there is provided a heater assembly for a haircare appliance, the heater assembly comprising:

- an air duct defining an air flow path extending from an upstream end to a downstream end;
- a first heater element positioned in the flow path, the first heater element having a first electrical path defined between cut-outs in a first sheet, the air flow path extending through said cut-outs; and
- a second heater element positioned in the flow path downstream of the first heater element, the second heater element having a second electrical path defined between cut-outs in a second sheet, the air flow path extending through said cut-outs,
- wherein the first electrical path has a first width and the second electrical path has a corresponding second width which is different to the first width.

The electrical paths of the heater elements being formed from sheets enables control over its shape which is not possible when the electrical paths are formed from wire. For example the electrical paths can branch, turn through angles tighter than those through which wire can be bent, and/or have projections via which the electrical paths can be supported so as to eliminate the need for separate support structures which are more obstructive to air flow.

The first and second electrical paths having different thicknesses means that all else being equal, they will have differing cross sectional areas in the direction of electrical flow. This, in turn, means that if the same electrical power is applied then the heating elements will heat up at different rates and can reach different maximum temperatures before failing due to overheating. Accordingly, the heating performance and/or resilience to failure of different heater elements can be tailored (for instance to their positions within the air flow path).

The first width of the first electrical path may be narrower than the second width of the second electrical path.

The second heater element, being downstream of the first, will be positioned in hotter air and therefore potentially more likely to overheat. By making the second electrical path wider than the first electrical path, the second heater element can be made more resistant to overheating all else being equal (due to the second electrical path having a larger cross sectional area in the direction of electrical flow, as discussed above). The first heater, on the other hand, can stay narrower due to it being in colder air during use, thereby maintaining its ability to heat air quickly.

The heater assembly may further comprise a third heater element positioned in the flow path downstream of the second heater element, the third heater element having a third electrical path defined between cut-outs in a third sheet, the air flow path extending through said cut-outs.

The heater assembly having more than two heater elements can allow it to have a greater heating effect, and/or allow it to heat air more gradually.

The second width of the second electrical path may be narrower than a corresponding third width of the third electrical path.

This may magnify the advantages discussed above in relation to the first width being narrower than the second width.

Each of said widths is preferably no more than 2 mm, for instance no more than 1 mm or no more than 0.6 mm.

Such relatively narrow electrical paths can provide them with a relatively small cross sectional area of the electrical path in the direction of electrical flow (all else being equal), which can result in relatively high heating performance of the heater elements.

Each of said widths may be no less than 0.05 mm, for instance no less than 0.1 mm or no less than 0.2 mm.

This can make the electrical paths thick enough to withstand handling both before and after assembly, more resistant to damage through exposure to high velocity airflow during use, and/or easier or cheaper to manufacture.

The cut-outs of each of said electrical paths may be formed by etching.

The use of etching can place advantageously few constraints on the shapes of the heating elements.

As an alternative, the cut-outs can be formed by any other suitable manufacturing technique such as stamping, water-jet cutting or laser cutting.

Each of said electrical paths may have a generally domed shape.

The electrical paths being generally domed can ensure that the electrical paths bend in a predictable direction during thermal expansion. In contrast, if the electrical paths were planar then during thermal expansion two adjacent electrical paths could bow in opposite directions, potentially touching one another and causing a short circuit. Instead or as well, domed electrical paths may be more resistant to deformation under action of high velocity air in the air flow path, in much the same way as an arch bridge can be more resistant to deformation under the weight of passing vehicles/pedestrians than a bridge which is simply flat.

Instead of or as well as being domed, each of said electrical paths may be generally planar.

This can make the electrical paths advantageously simple to produce, and can allow the heater elements and thus the heater assembly as a whole to be advantageously compact.

The air duct may be formed by a stack of annular elements each of which defines an axial portion of the air duct.

This can make the heater assembly more customisable, allowing different lengths of flow path to be formed for different applications by utilising different numbers of annular elements.

As an alternative, the flow path may be formed as a single piece. As another alternative, the flow path may be formed from an array of circumferential sections.

Each heater element may be embedded within a respective one of said annular elements.

For example, each heater element may have an annular element overmolded onto it.

Each heater element being embedded in an annular element can allow it to be handled, for instance during assembly or inspection, with less risk of damage.

As an alternative, each heater element may be sandwiched between a pair of annular elements.

One of said annular elements may form a spacer between adjacent heater elements.

This can allow more efficient mixing of flow between adjacent heater elements, allowing for more even heating of air in the air flow path.

The spacer may support a temperature sensor (for instance a thermocouple) in the flow path. This can allow the heating process to be monitored before it is complete, which can allow adjustments to be made to the electrical power supplied to the heater element(s) downstream of the spacer. For example if the temperature sensor detected that the air was at an unusually high temperature at that point in the flow path, it may signal a controller to reduce the electrical power delivered to the downstream heater element(s) so as to decrease their heating effect and thereby prevent the air from exiting the flow path at too high a temperature.

The electrical path of each heater element may be positioned substantially entirely within the air flow path.

This can allow the heater element to be heated to a higher temperature than would be possible if a significant part of the electrical path were shielded from the cooling effect of air in the air flow path (for instance by virtue of being embedded in an annular element).

At least two neighbouring electrical paths may be spaced apart by no more than 10 mm, for instance no more than 5 mm or no more than 3 mm.

This can allow the heater assembly to be advantageously compact.

Each electrical path may be spaced apart from its neighbouring electrical path(s) by at least 0.5 mm, for instance at least 1 mm or at least 1.5 mm. This can reduce the risk of adjacent electrical paths touching, and potentially creating a short circuit or damaging one another.

The air duct may be generally circular in cross section, for instance slightly oval, elliptical or racetrack-shaped, or exactly circular. This can allow the heater assembly to fit within the handle of a haircare appliance more easily while maintaining as large a cross section of air flow path as possible.

Each heater element may be made of metal and exposed directly to air in the air flow path. This can maximise the heat transfer between the heater element and air in the airflow path, in contrast to an arrangement where the metal is shielded from direct contact with the air (for instance by an electrically insulative coating).

The metal from which the heater element may be made includes stainless steel, NiChrome, Inconel, Tin, Hastelloy B or C, and Nimonic 115, for example.

The thickness of the first sheet may be different to the thickness of the second sheet.

The sheets having different thicknesses means that all else being equal, the first and second electrical paths will have differing cross sectional areas in the direction of electrical flow. This, in turn, means that if the same electrical power is applied then the heating elements will heat up at different rates and can reach different maximum temperatures before failing due to overheating. Accordingly, the heating performance and/or resilience to failure of different heater elements can be tailored (for instance to their positions within the air flow path).

The second sheet may be thicker than the first sheet.

The second heater element, being downstream of the first, will be positioned in hotter air and therefore potentially more likely to overheat. By making the second sheet thicker than the first sheet, the second heater element can be made more resistant to overheating all else being equal (due to the second electrical path having a larger cross sectional area in the direction of electrical flow, as discussed above). The first heater, on the other hand, can stay thinner due to it being in colder air during use, thereby maintaining its ability to heat air quickly.

Each of the sheets is preferably no more than 2 mm thick, for instance no more than 1 mm thick or no more than 0.5 mm thick.

Such relatively thin sheets can provide a relatively small cross sectional area of the electrical path in the direction of electrical flow (all else being equal), which can result in relatively high heating performance of the heater elements.

Each of the sheets is preferably no less than 0.005 mm thick, for instance no less than 0.01 mm thick or no less than 0.03 mm thick.

This can make the heating elements thick enough to withstand handling both before and after assembly, more resistant to damage through exposure to high velocity airflow during use, and/or easier or cheaper to manufacture.

Optionally:

- the heater assembly comprises electrical circuitry for connection to a power source;
- the first and second electrical paths are provided in respective first and second circuit branches; and
- the first and second circuit branches are connected in electrical parallel within said circuitry.

For the avoidance of doubt, reference herein to circuit branches being connected in electrical parallel refers to the fact that they define separate paths for electrical flow, rather than being connected in series where a single electrical path runs through both circuit branches. The term is not intended to imply that the circuit branches are joined to one another at any specific electrical or spatial position.

With the first and second electrical paths being connected electrically in parallel, their impact on one another can be minimised. For instance, the two electrical paths can be supplied with a different voltage and/or current to one another, which would not be possible if they were connected in series. As another example, one or both of the first and second heating elements could be disconnected from a power supply (for instance by an electrical or mechanical switch) without necessarily disconnecting the other.

One of said heater elements may be connected in series with a further heater element, within the corresponding circuit branch.

This can increase the electrical resistance of the circuit branch in question, preventing overloading of a sole heating element without requiring more complex circuitry, or wasting electrical power such as would occur if a resistor were used in place of a further heater element. Instead or as well, connecting some heater elements in series can reduce the amount of wiring required in comparison to if they were all provided in parallel, which can reduce the overall cost, complexity and/or assembly time of the heater assembly.

Instead or as well, further heater elements may be provided in further circuit branches.

Each of said heater elements may be connected in series with a respective further heater element, within the corresponding circuit branch.

This can further increase the benefits discussed above.

The circuitry may include power control components arranged to supply the different circuit branches with different voltages and/or currents.

This can allow the electrical power delivered to different heater elements to be tailored to their specific requirements. For instance a heating element with an electrical path which has a relatively narrow electrical path can be provided with less electrical power so as to combat potential overheating, or a heater element at an upstream end can be supplied with greater electrical power since it will be cooled more by air in the air flow path and thus will be less likely to overheat.

According to a second aspect of the present invention there is provided a haircare appliance comprising a heater assembly according to the first aspect of the invention.

BRIEF DESCRIPTION OF THE FIGURES

The invention will now be described with reference to the accompanying drawings in which.

DETAILED DESCRIPTION OF PARTICULAR EMBODIMENTS

Figure 1:
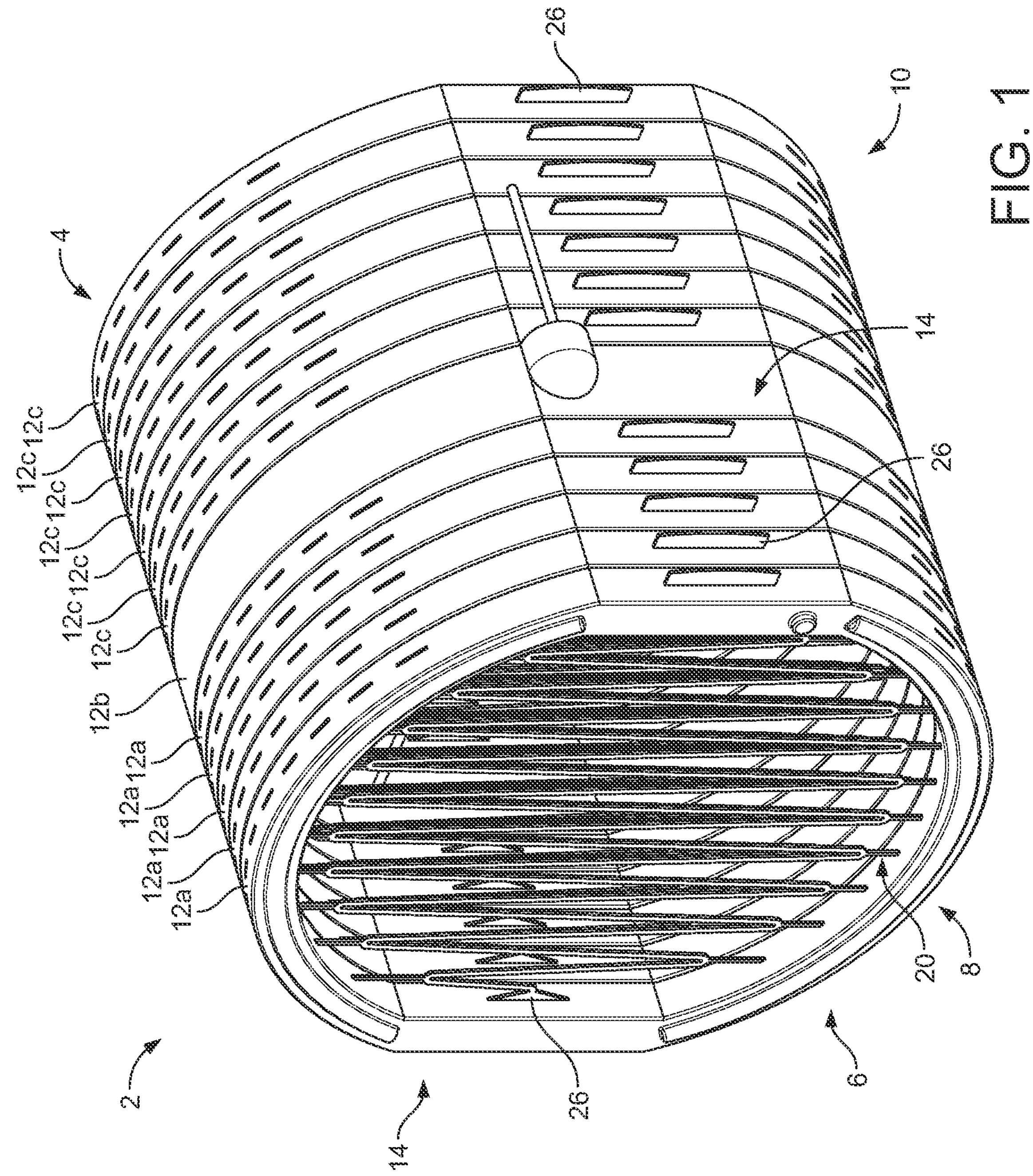
FIG. 1 is a perspective view of a part of a heater assembly according to a first embodiment of the invention.

Throughout the description and drawings, corresponding reference numerals denote corresponding features.

FIG. 1 shows a part 2 of a heater assembly according to a first embodiment of the invention. The heater assembly has an air duct 4 which defines an air flow path 6 through it, extending from an upstream end 8 to a downstream end 10. The air duct 4 is made up of a stack of annular element 12*a*, 12*b*, 12*c*, each of which defines a (relatively short) axial portion of the air duct 4.

In this specific embodiment the air duct 4 is generally circular in cross section, with a pair of flat sides 14 which give it a slight racetrack-shape. Each of the annular elements 12*a*-12*c* has a corresponding cross sectional shape. In this embodiment each of the annular elements 12*a*-12*c*, and thus the air duct 4 as a whole, is made from liquid crystal polymer.

Figure 2:
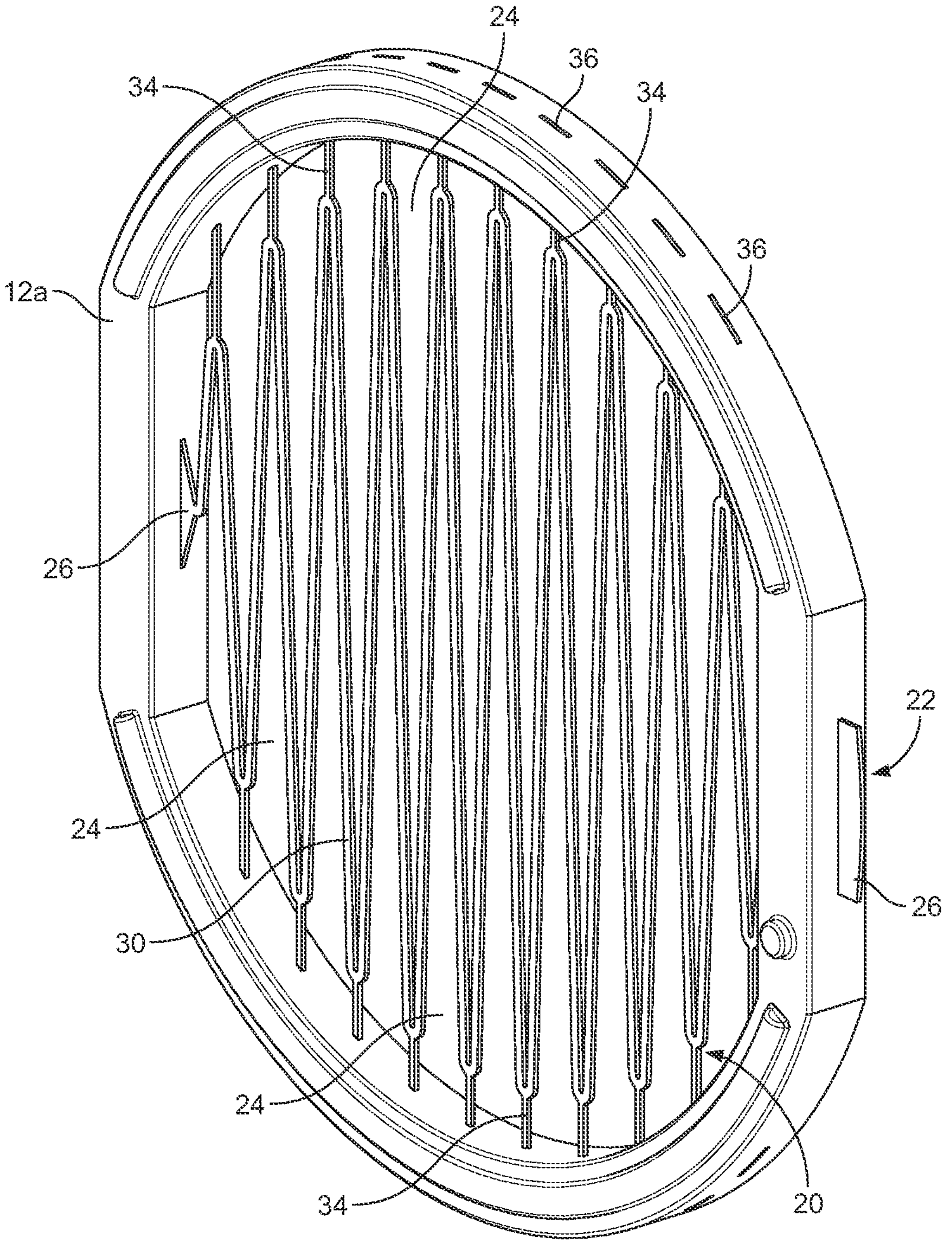
FIG. 2 is a perspective view of an annular element and heater element of the part of a heater assembly shown in FIG. 1.
Figure 3:
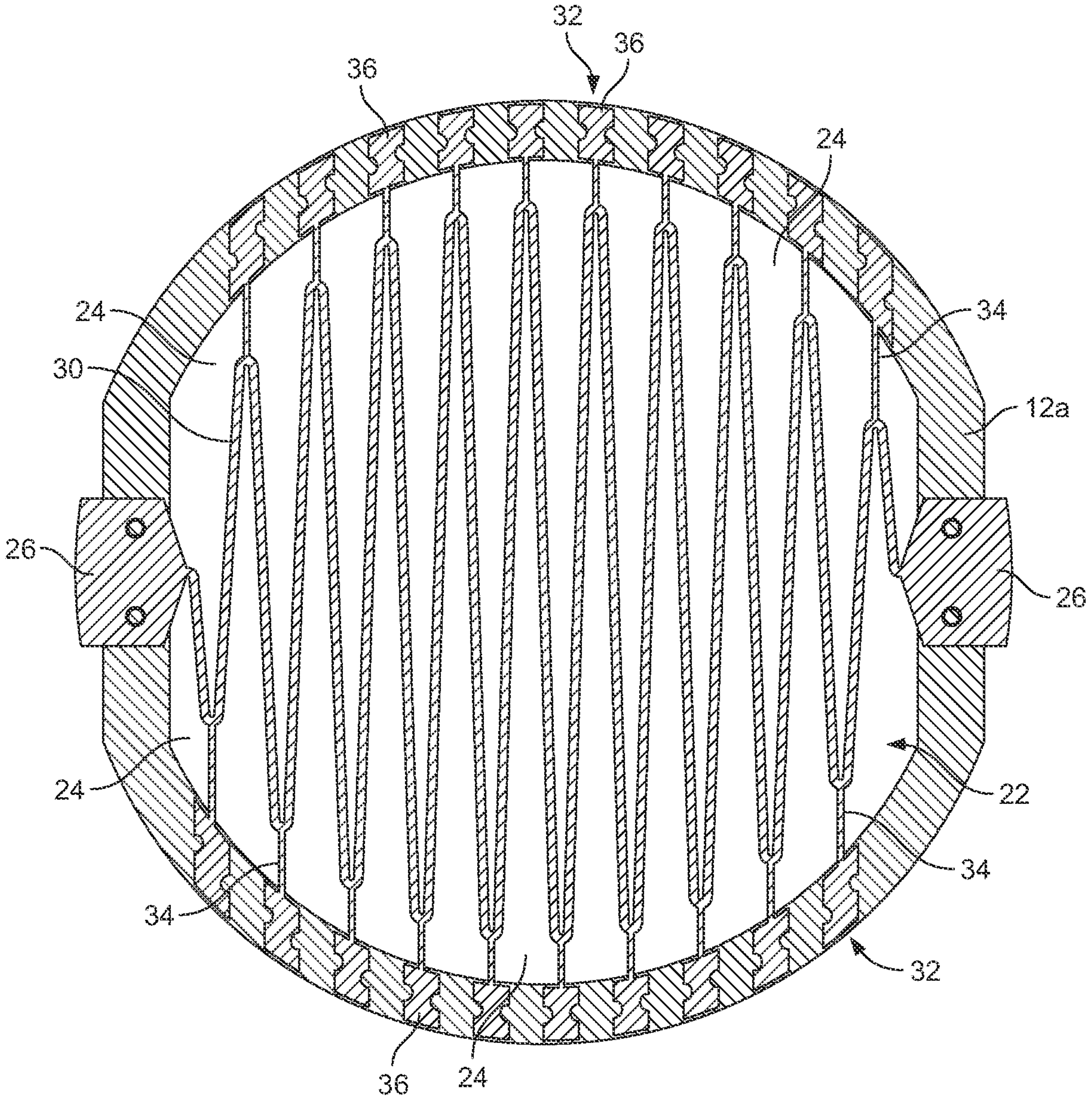
FIG. 3 is a cross-sectional view of the annular element and heater element of FIG. 2.
Figure 4:
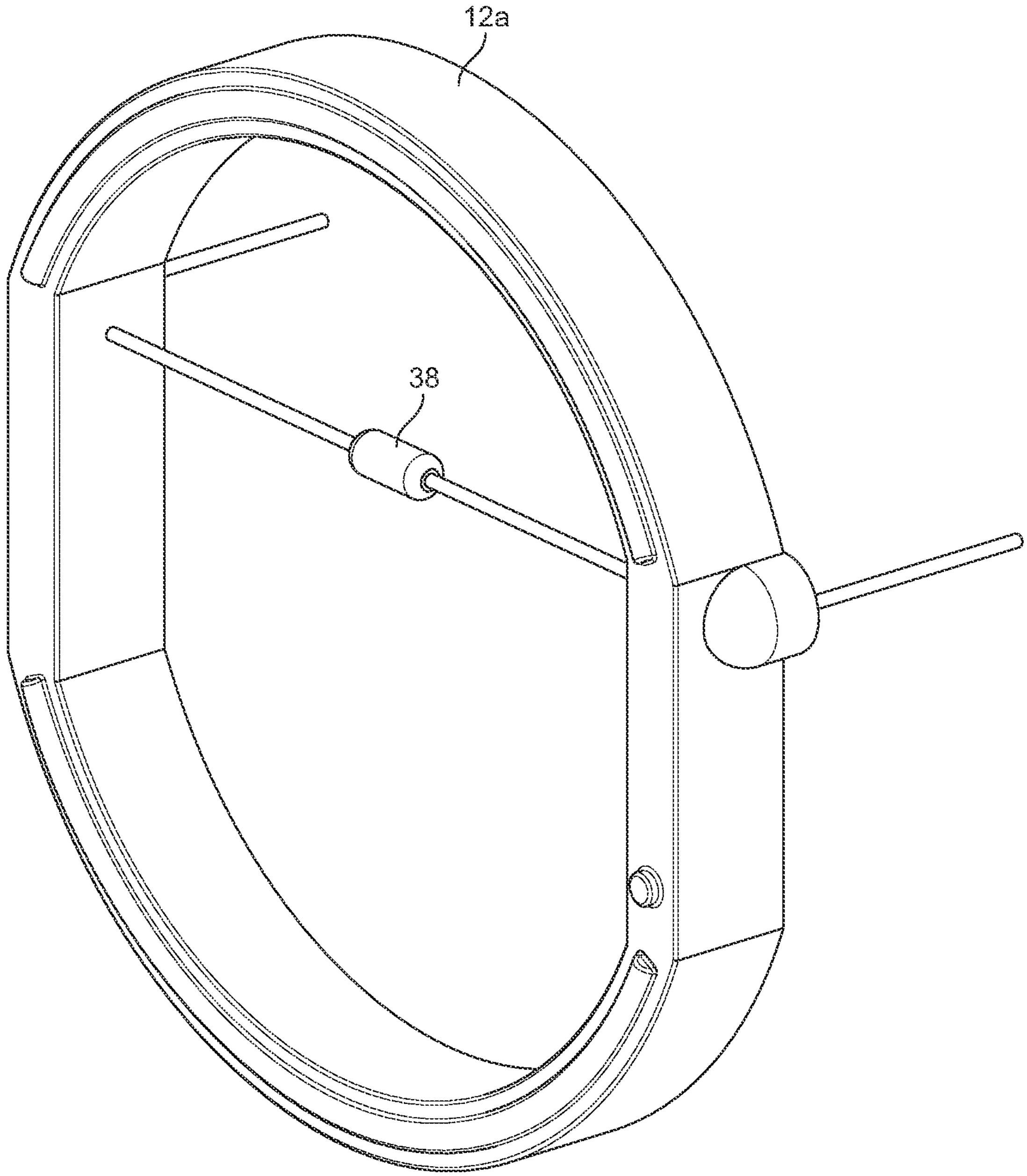
FIG. 4 is a perspective view of a spacer of the part of a heater assembly shown in FIG. 1.

Each of the annular elements 12*a* supports a heater element 20, any one of which may be a ‘first heater element’ within the meaning of the present invention. In this embodiment each of the annular elements 12*a* has a heater element 20 embedded in it due to the annular element 12*a* having been overmolded on top of its heater element 20. FIGS. 2 and 3 show one of the annular elements 6*a* with its heater element 20, each of the other heater elements 20 of the other annular elements 12*a* having the same shape.

In this embodiment, each heater element 20 is formed in its entirety from a bare metal sheet 22 in which a set of cut-outs 24 have been made by etching. Each heater element comprises a pair of contact tabs 26, for connection to a power supply via a controller as discussed later. An electrical path 30 is defined between the cut-outs 24 such that it runs in a zig-zag between the two contact tabs 26.

Extending from each apex of the zig-zagging electrical path 30 is a support structure 32 which has a thin bridge 34 that terminates in an hourglass-shaped support tab 36. The contact tabs 26 and support tabs 36 encircle the electrical path 30, and are embedded within the annular element 12*a*. This allows the electrical path 30 to be positioned entirely within the air flow path 6. The contact tabs 26 also project outwards beyond the annular element 12*a* so that they can be connected to electrical circuitry as described later.

For the avoidance of doubt, the thin bridges 34 may experience some slight electrical current flow through them during use. However, it is to be understood that such current flow would be minimal and would have negligible effect on the heater element 20 as a whole. They are not, therefore, considered to be part of the electrical path 30.

As noted above, in this embodiment the sheets 22 from which the electrical paths 30 (and indeed the entire heater elements 20) are formed are planar. The electrical paths 30, and indeed the heater elements 20 as a whole, are therefore also planar. In this case the heater elements 20 (and thus the electrical paths 30) are positioned normal to the air flow path 6.

The heater elements 20 embedded in the annular elements 12*c*, any one of which may constitute a ‘second heater element’ within the meaning of the present invention, have substantially the same shape and configuration of those of annular elements 12*a*. However, the heater element 20 of each of the annular elements 12*a* is formed from a sheet which is 0.1 mm thick, and the electrical path 30 of each of those heater elements is 0.3 mm wide. In contrast, the heater element 20 of each of the annular elements 12*c* is formed from a sheet which is 0.3 mm thick, and the electrical path 30 of each of those heater elements is 0.4 mm wide. Accordingly, the electrical paths 30 of the heater elements 20 of the annular elements 12*c* have a larger cross sectional area, in the direction of electrical flow, than those of the heater elements 20 of annular elements 12*a*. Those heater elements 20 further downstream in the air flow path 6 therefore experience less electrical heating.

In this embodiment the thickness (in the axial direction) of the annular elements 12*a* is selected such that within the group of heater elements 20 supported by those annular elements, the electrical path 30 of each heater element 20 is spaced apart from its neighbouring electrical path(s) 30 by 2 mm. Similarly, the thickness of the annular elements 12*c* is selected such that within the group of heater elements 20 supported by those annular elements, the electrical path 30 of each heater element 20 is spaced apart from its neighbouring electrical path(s) 30 by 2 mm. In some circumstances this spacing may be an optimum compromise, packing the electrical paths 30 relatively close together for the sake of compactness, but spacing them apart by far enough to prevent them touching after bowing due to thermal expansion. The electrical paths 30 (and indeed the the heater elements 20 as a whole) of this embodiment are made of metal, as discussed above, and are exposed directly to air flow in the air flow path 6. Accordingly, is it particularly important that the electrical paths 30 do not touch because the lack of insulative coating means that contact between them would cause a short circuit.

Although the electrical paths 30 of the group of heater elements 20 supported by annular elements 12*a* are spaced apart by 2 mm, and the same is true of the electrical paths 30 of the group of heater elements 20 supported by annular elements 12*c*, the electrical path 30 of the most downstream heater element 20 supported by an annular element 12*a* is spaced apart from the electrical path 30 of the most upstream heater element 20 supported by an annular element 12*c* by 6 mm. This is due to annular element 12*b*, which forms a spacer between those two heater elements 20 (and, in this embodiment, their respective annular elements 12*a*, 12*c*). In this embodiment, the spacer 12*b* supports a temperature sensor in the form of a thermocouple 38 within the air flow path 6, the purpose of which will be discussed later.

Figure 5:
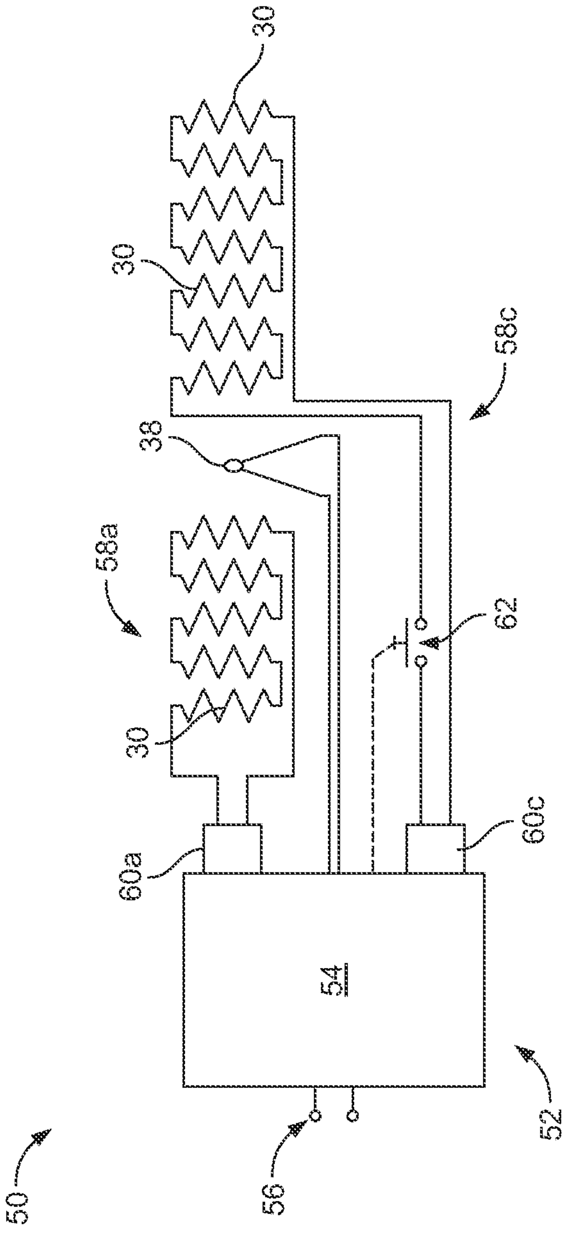
FIG. 5 is an electrical schematic of a heater assembly including the part shown in FIG. 1.

The part 2 of the heater assembly shown in FIG. 1 is connected to electrical circuitry which, in turn, is connectable to a power source such as a battery or mains electricity. An electrical schematic of the heater assembly 50, showing the electrical circuitry 52, is shown in FIG. 5. The electrical circuitry 52 has a controller 54 which has terminals 56 for connection to a power source (not shown), and first and second circuit branches 58*a*, 58*c*, provided in electrical parallel, via which electrical power from the power source can be supplied to the heater elements 20.

The first circuit branch 58*a* includes each of the heater elements 20 supported by an annular element 12*a*, those heater elements 20 being connected in series with one another. Accordingly, one or more of those heater elements 20 may constitute a 'further heater element' within the meaning of the present invention. The second circuit branch 58*c* includes each of the heater elements 20 supported by an annular element 12*c*, those heater elements 20 being connected in series with one another. One or more of those heater elements 20 may constitute a 'further heater element' within the meaning of the present invention, instead or as well.

As noted above, the two circuit branches 58*a*, 58*c* are connected in parallel with one another. Each circuit branch 58*a*, 58*c* has a corresponding set of power control components 60*a*, 60*c* via which electrical power can be supplied to that branch. In this case the power control components 60*a* are configured to provide the first circuit branch 58*a* with a higher voltage than is supplied to the second circuit branch 58*c* by power control components 60*b*.

The controller 54 is also connected to the thermocouple 38, and to a switch 62 positioned in the second circuit branch 58*c*. In use, the controller monitors the temperature of the air after it has passed through the heater elements 20 supported by annular elements 12*a*, and if the temperature exceeds a threshold the controller 54 opens the switch 62 so as to disconnect the heater elements 20 supported by annular elements 12*c* and prevent any further heating from taking place.

Figure 6:
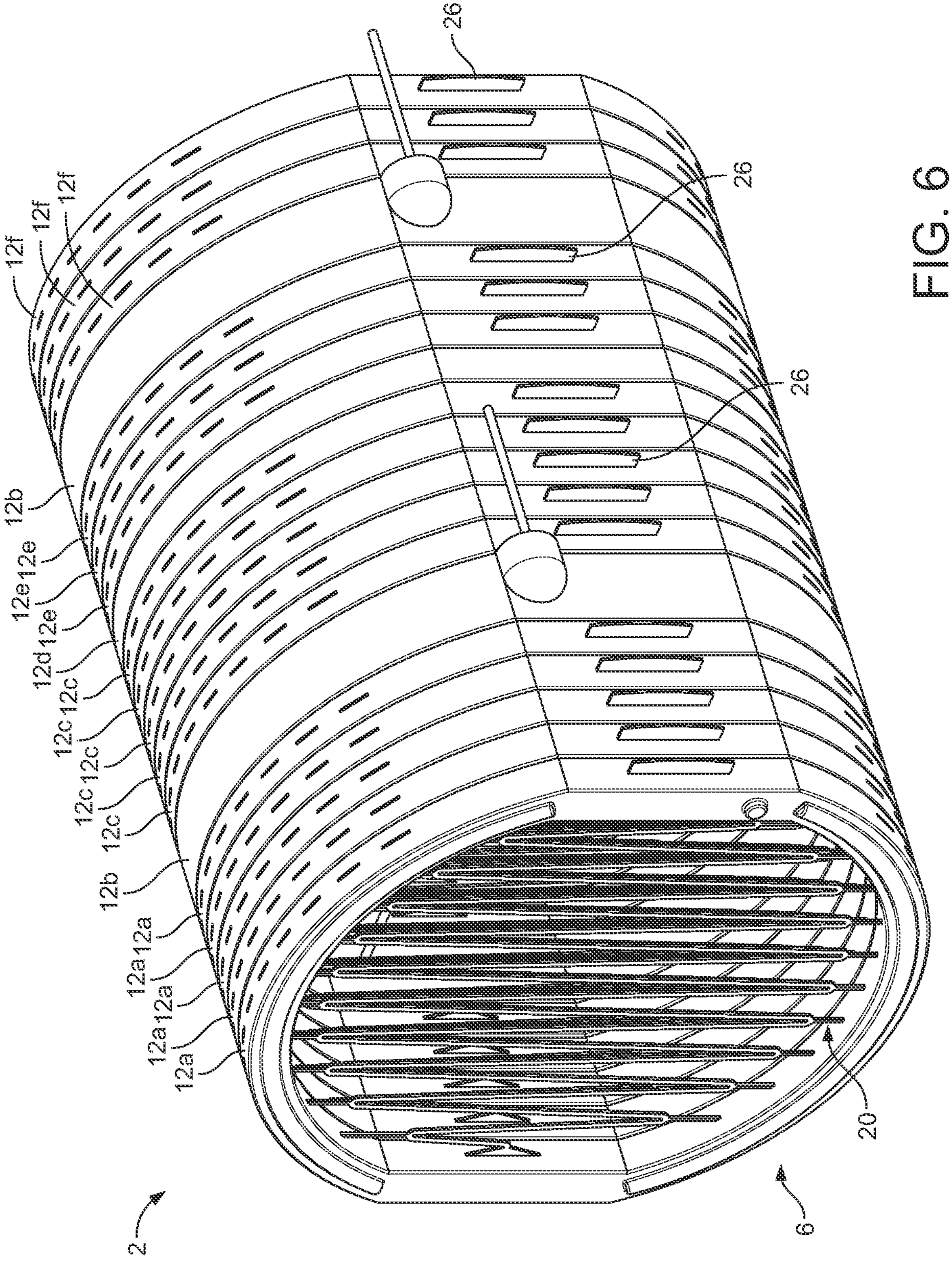
FIG. 6 is a perspective view of a part of a heater assembly according to a second embodiment of the invention.
Figure 7:
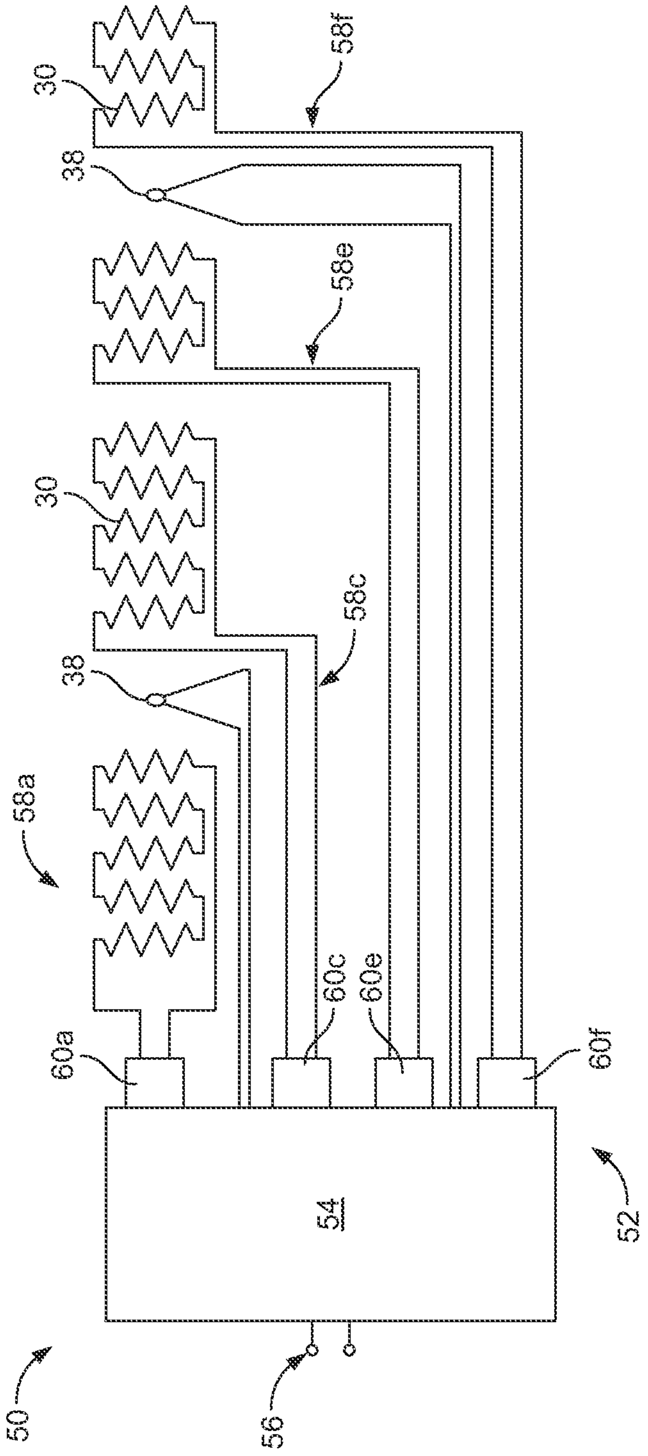
FIG. 7 is an electrical schematic of a heater assembly including the part shown in FIG. 6.

FIGS. 6 and 7 show a heater assembly 50 according to a second embodiment of the invention. The second embodiment is similar to the first embodiment, therefore only the differences will be described.

Whilst the first embodiment utilised two different sized heater elements 20, those supported by annular elements 12*a* and those supported by annular elements 12*c*, the second embodiment utilises four different sized heater elements 20, those supported by annular elements 12*a*, those supported by annular elements 12*c*, those supported by annular elements 12*e* and those supported by annular elements 12*f*. In this embodiment the heater elements 20 supported by annular elements 12*a*, 12*c*, 12*e* and 12*f* have electrical paths 30 formed from sheets which are 0.05 mm, 0.1 mm, 0.2 mm and 0.3 mm respectively and the widths of those electrical paths are 0.25 mm, 0.35 mm, 0.4 mm and 0.45 mm respectively.

Following the convention set out above, in which any one of the heater elements 20 supported by an annular element 12*a* could constitute a 'first heater element' and any one of the heater elements 20 supported by an annular element 12*c* could constitute a 'second heater element', it follows that any one of the heater elements 20 supported by an annular element 12*e* could constitute a 'third heater element' according to the present invention. However, for the avoidance of doubt any one of the heater elements 20 supported by an annular element 12*f* could constitute a 'third heater element'. Furthermore, it is equally possible for one of the heater elements 20 supported by an annular element 12*c* to constitute a 'first heater element', one of the heater elements 20 supported by an annular element 12*e* to constitute a 'second heater element' and one of the heater elements 20 supported by an annular element 12*f* to constitute a 'third heater element'.

The second embodiment also differs from the first embodiment in that there are two spacers 12*b* which support thermocouples 38, and a further spacer 12*d* which spaces apart the heater elements 20 (and their respective annular elements 12*c*, 12*d*) either side of it for the sake of flow smoothing but does not support any components in the air flow path 6.

The electrical circuitry 52 of the second embodiment has four circuit branches 58*a*, 58*c*, 58*e* and 58*f*, with corresponding power control components 60*a*, 60*c*, 60*e* and 60*f*, within which the heater elements 20 supported by annular elements 12*am* 12*cm* 12*e* and 12*f* respectively are connected in series. In this case power control components 60*c*, 60*e* and 60*f* are configured to be actively managed by the controller to adjust the voltages supplied to their respective circuit branches 58*c*, 58*e*, 58*f* based on feedback from the two thermocouples 38 so as to provide the smoothest possible heating along the length of the air flow path 6.

Figure 8:
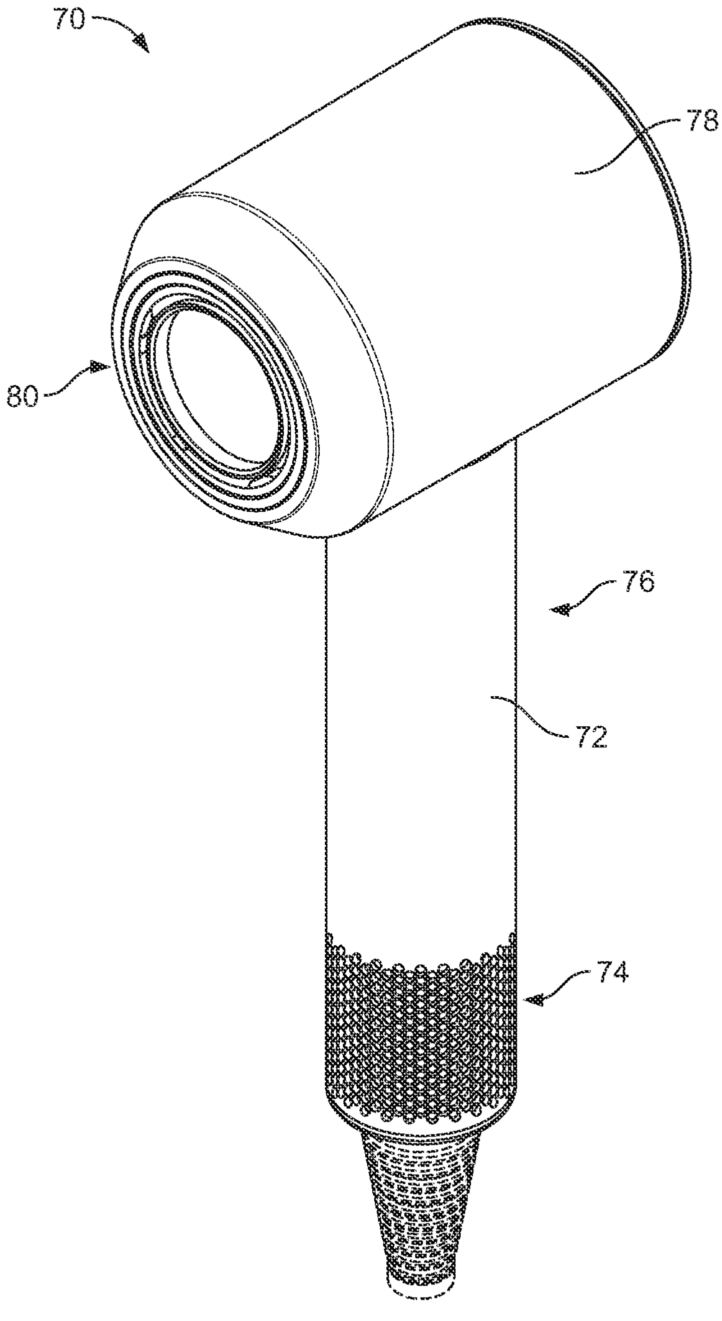
FIG. 8 is a perspective view of a hairdryer which may include the heater assembly of FIGS. 1 to 5 or FIGS. 6 and 7.

FIG. 8 shows a haircare appliance in the form of a hairdryer 70, which may comprise a heater assembly 50 according to one of the above embodiments of the invention. The hairdryer 12 has a cylindrical handle 72 with an air inlet 74 at its base, above which is a motor-driven fan (not visible) for drawing air through the hairdryer. An upper portion 76 of the handle 72 may comprise the heater assembly 50, hot air being ducted from the handle 72 and into a head 78 of the hairdryer before exiting through an annular outlet 80 at the front of the head. A flex (not shown) runs up into the bottom of the handle 72 so as to supply the hairdryer with mains electricity for driving the motor-driven fan (not visible) and powering the heater assembly 50.

It will be appreciated that numerous modifications to the above described embodiments may be made without departing from the scope of invention as defined in the appended claims. For instance, rather than being purely planar, the electrical paths of one or more heater elements may be domed, due to being formed between cut-outs in a domed sheet. The domed electrical paths may for example protrude slightly in the upstream direction along the flow path. As another example, the air duct (and the heater elements) may be square, hexagonal or octagonal rather than being generally round in cross section.

For the avoidance of doubt, although the associated electrical circuitry has been described as forming part of the heater assembly of the first and second embodiments, in other embodiments the necessary circuitry may be provided separately.

The invention claimed is:

1. A heater assembly for a haircare appliance, the heater assembly comprising:

an air duct defining an air flow path extending from an upstream end to a downstream end;

a first heater element positioned in the flow path, the first heater element having a first electrical path defined between cut-outs in a first sheet, the air flow path extending through said cut-outs; and a second heater element positioned in the flow path downstream of the first heater element, the second heater element having a second electrical path defined between cut-outs in a second sheet, the air flow path extending through said cut-outs, wherein the first electrical path has a first width and the second electrical path has a corresponding second width which is different to the first width.

2. The heater assembly according to claim 1 wherein the first width of the first electrical path is narrower than the second width of the second electrical path.

3. The heater assembly according to claim 1 further comprising a third heater element positioned in the flow path downstream of the second heater element, the third heater element having a third electrical path defined between cut-outs in a third sheet, the air flow path extending through said cut-outs.

4. The heater assembly according to claim 3 wherein the second width of the second electrical path is narrower than a corresponding third width of the third electrical path.

5. The heater assembly according to claim 1 wherein each of said widths is no more than 1 mm.

6. The heater assembly according to claim 1 wherein each of said widths is no less than 0.1 mm.

7. The heater assembly according to claim 1 wherein the cut-outs of each of said electrical paths are formed by etching.

8. The heater assembly according to claim 1 wherein each of said electrical paths has a generally domed shape.

9. The heater assembly according to claim 1 wherein each of said electrical paths is generally planar.

10. The heater assembly according to claim 1 wherein the air duct is formed by a stack of annular elements each of which defines an axial portion of the air duct.

11. The heater assembly according to claim 10 wherein each heater element is embedded within a respective one of said annular elements.

12. The heater assembly according to claim 10 wherein one of said annular elements forms a spacer between adjacent heater elements.

13. The heater assembly according to claim 1 wherein the electrical path of each heater element is positioned substantially entirely within the air flow path.

14. The heater assembly according to claim 1 wherein at least two neighbouring electrical path are spaced apart by no more than 5 mm.

15. A haircare appliance comprising the heater assembly according to claim 1.

* * * * *